United States Patent
Ando

(10) Patent No.: US 7,382,971 B2
(45) Date of Patent: Jun. 3, 2008

(54) IMAGE DATA RECORDING APPARATUS AND METHOD

(75) Inventor: Tsutomu Ando, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 10/715,452

(22) Filed: Nov. 19, 2003

(65) Prior Publication Data
US 2004/0101284 A1    May 27, 2004

(30) Foreign Application Priority Data
Nov. 21, 2002    (JP)    ............... 2002-338109

(51) Int. Cl.
*H04N 7/26*    (2006.01)
(52) U.S. Cl. ............... 386/109; 348/419.1; 348/423.1
(58) Field of Classification Search ............... 386/109
See application file for complete search history.

(56) References Cited

U.S. PATENT DOCUMENTS

| | | | |
|---|---|---|---|
| 5,418,863 A | 5/1995 | Ando | 382/56 |
| 5,579,412 A | 11/1996 | Ando | 382/240 |
| 5,848,194 A | 12/1998 | Ishizuka et al. | 382/234 |
| 6,393,196 B1 * | 5/2002 | Yamane et al. | 386/52 |
| 6,477,313 B1 | 11/2002 | Itoi | 386/52 |

FOREIGN PATENT DOCUMENTS

| | | |
|---|---|---|
| EP | 1193983 A2 | 4/2002 |
| JP | 11-213566 | 8/1999 |
| JP | 2001-195840 | 7/2001 |

OTHER PUBLICATIONS

Patent Abstracts of Japan, vol. 1999, No. 12, JP11 187354A, Jul. 9, 1999 Abstract (one page).
Patent Abstracts of Japan, vol. 1999, No. 8, JP11 074799A, Mar. 16, 1999, Abstract (one page).

* cited by examiner

*Primary Examiner*—Marsha D. Banks-Harold
*Assistant Examiner*—Daniel Tekle
(74) *Attorney, Agent, or Firm*—Fitzpatrick, Cella, Harper & Scinto

(57) ABSTRACT

Image data is encoded using a buffer memory, and code amount of image data occupying the buffer memory upon coding is detected and buffer information related to the detected code amount is outputted. The coded image data and the buffer information are recorded on a recording medium. In a case where additional recording or overwriting is started, the buffer information in a position immediately before a start position of the additional recording or overwriting is read out, and coding is started based on value, thereby buffer overflow can be prevented.

1 Claim, 10 Drawing Sheets

IMAGE DATA RECORDING APPARATUS AND METHOD

FIELD OF THE INVENTION

The present invention relates to an image data recording apparatus and method, and more particularly, to a technique for enabling seamless scene-sequence photographing without frame skip upon additional recording or overwriting in an apparatus to record coded image data.

BACKGROUND OF THE INVENTION

In recent years, moving image coding methods such as MPEG (Moving Picture Expert Group) coding having an inter-frame motion-compensation function have been rapidly put into practical use by development of semiconductor technology or the like. As video coding standards, defined are MPEG-1 (ISO/IEC 11172-2), MPEG-2 (ISO/IEC 13818-2) and MPEG-4 (ISO/IEC 14496-2) providing an inter-frame motion-compensation function.

FIG. 7 shows an example of frame structure with motion compensation employed in MPEG video coding.

In FIG. 7, in an I (Intra) frame, coding is completed within the frame (intra-frame coding), and in a P (Predictive) frame, only a past frame to the time axis is used in motion prediction (forward prediction). Further, in a B (Bi-directional) frame, past and future frames to the time axis are used in motion prediction (bi-directional prediction).

In the MPEG-4 coding, the use of B frame may be limited in a profile regulation. Arbitrary plural frames can be handled as a group as GOP (Group Of Pictures). In FIG. 7, frames 1 to 15 are handled as one GOP.

In the MPEG standards, the coding rate is controlled by using a virtual buffer, VBV (Video Buffering Verifier). The VBV will be described with reference to FIG. 8. FIG. 8 is a graph showing time change of buffer occupation amount.

The VBV buffer size is defined by profile. For example, in the MP@ML (main profile, main level) already used in many applications, the maximum VBV buffer size is 1,835,008 bits.

The encoder controls a coding amount to each frame while monitoring the VBV buffer size. A virtual decoder capable of instantaneous decoding by frame is prepared, to read data from the buffer instantaneously and decode the data.

At this time, buffer overflow is prohibited in any case. Further, buffer underflow must not occur except in a low-delay mode. On the other hand, in the low-delay mode, the buffer underflow may occur, however, there is a possibility that a frame skip state (the same frame is repeatedly played back for a predetermined period) occurs.

Since the VBV buffer is a virtual buffer, the occupancy of the VBV buffer itself is detected on the decoder side in frame units (or field units in minimum time), but it is not set in code data for transmission.

Next, an example where MPEG data is recorded on a random-inaccessible medium such as a magnetic tape, will be considered. FIG. 10 shows recording tracks on the magnetic tape. A magnetic tape T as a recording medium has a recording unit called "track" scanned by a head. In the figure, tracks 1001 to 1048 are formed in a direction intersecting a tape running direction at a predetermined angle.

Further, as a countermeasure for reading error, an ECC (Error Correction Code) is added by at least one track. This is called an ECC interleave block. In FIG. 10, 16 tracks constitute 1 ECC interleave block. More specifically, tracks 1001 to 1016 constitute an ECC interleave block 1; tracks 1017 to 1032, an ECC interleave block 2; and tracks 1033 to 1048, an ECC interleave block 3.

Accordingly, additional recording, overwriting and the like can be made by ECC interleave block. Further, Japanese Patent Application Laid-Open No. 11-213566 discloses recording by GOP corresponding to at least one ECC interleave block.

Further, as a method for scene-sequence photographing with such medium, Japanese Patent Application Laid-Open No. 2001-195840 discloses processing of appropriately inserting invalid data before and after scene-sequence photographing thereby temporarily increasing the coding rate.

However, the conventional techniques as described above have the following problems.

First, when scene-sequence photographing is to be performed, as the information on buffer occupation amount is lost, trouble may occur in the rate control function and reproduction. FIG. 9 is a graph similar to FIG. 8 showing time change of buffer occupation amount. In FIG. 9, the information on buffer occupation amount is lost upon start of scene-sequence photographing (t0), then the buffer occupation amount exceeds the VBV buffer size, and buffer overflow occurs.

Secondly, in a case where invalid data is appropriately inserted for prevention of buffer overflow after the start of scene-sequence photographing, the buffer occupation amount is further increased (i.e., the rate is increased), and the rate control itself may be harmfully influenced.

Thirdly, after the scene-sequence photographing, a similar problem occurs in the portion of scene-sequence photographing and the previously-recorded background portion, which degrades image quality upon reproduction.

Accordingly, in the conventional methods, seamless scene-sequence photographing cannot be performed without difficulty.

SUMMARY OF THE INVENTION

The present invention has its object to enable seamless scene-sequence photographing without frame skip upon additional recording or overwriting in an apparatus to record coded image data.

Another object of the present invention is to provide a method for enabling seamless scene-sequence photographing without frame skip upon additional recording or overwriting in recording of coded image data.

According to one aspect of the present invention, the foregoing object is attained by providing an image data recording apparatus comprising: coding means for encoding image data using a buffer memory; buffer occupation amount detection means for, upon coding by the coding means, detecting a code amount of the image data occupying the buffer memory, and outputting buffer information related to the detected code amount of the image data; and recording means for recording the coded image data and the buffer information on a recording medium.

That is, according to the one aspect of the present invention, image data is encoded, information on a code amount of the image data occupying the buffer upon coding is detected, and the coded image data and buffer information on the detected code amount are recorded on a recording medium.

In this arrangement, upon start of additional recording or overwriting, a buffer occupation amount immediately before a start point of the additional recording/overwriting is set, and coding is started with the value, thereby buffer overflow can be prevented.

Accordingly, seamless scene-sequence photographing without frame skip can be performed in additional recording or overwriting.

The buffer occupation amount detection means may output the buffer information for every recording unit of the coded image data.

In this case, preferably, the image data recording apparatus further comprises error correction processing means for performing error-correction coding processing on the coded image data, the recording means performs interleave processing by a plurality of error correction blocks and performs recording, and the buffer occupation amount detection means outputs the buffer information by the plurality of error correction blocks for the interleave processing.

The coding means may encode the image data by MPEG coding, with the buffer information as a value of a VBV (Video Buffer Verifier).

The image coding means may encode the image data by MPEG coding, and the buffer occupation amount detection means may output the buffer information by GOP (Group Of Pictures).

The recording means may record the coded image data and the buffer information in plural tracks formed on a tape type recording medium, such that the buffer information is recorded in a predetermined area of the plural tracks.

Preferably, the coding means encodes the image data by intra-frame coding and inter-frame prediction coding.

The coding means may control the code amount of the image data based on the buffer information.

Further, according to another aspect of the present invention, the foregoing object is attained by providing an image data recording apparatus which records new image data, encoded by intra-frame coding and inter-frame prediction coding, on a tape type recording medium on which coded image data is already recorded, comprising: coding means for encoding image data using a buffer memory; buffer occupation amount detection means for, upon coding by the coding means, detecting a code amount of the image data occupying the buffer memory, and outputting buffer information related to the detected code amount of the image data; and recording means for recording the coded image data and the buffer information on the tape type recording medium.

That is, according to the other aspect of the present invention, when new image data, encoded by intra-frame coding and inter-frame prediction coding, is recorded on a tape type recording medium where coded image data is already recorded, the image data is encoded, a code amount of the image data occupying the buffer upon coding is detected, and the coded image data and buffer information on the detected code amount are recorded on the recording medium.

In this arrangement, upon start of additional recording or overwriting on a random-inaccessible tape type recording medium, a buffer occupation amount immediately before the start of additional recording/overwriting is set, and coding is started with the value, thereby buffer overflow can be prevented. Further, seamless scene-sequence photographing without frame skip can be performed upon additional recording or overwriting.

Preferably, the image data recording apparatus further comprises reproduction means for reproducing the image data and the buffer information from the tape type recording medium, and the coding means performs coding processing on the new image data by using the buffer information reproduced by the reproduction means.

The coding means may control the code amount of the new image data based on the buffer information reproduced from a position immediately before a recording start position of the new image data in the tape type recording medium.

Further, the above and other objects are attained by an image data recording method having steps corresponding to the respective means of any of the above image data recording apparatus, a computer program to realize the image data recording method by a computer, and a storage medium holding the computer program.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
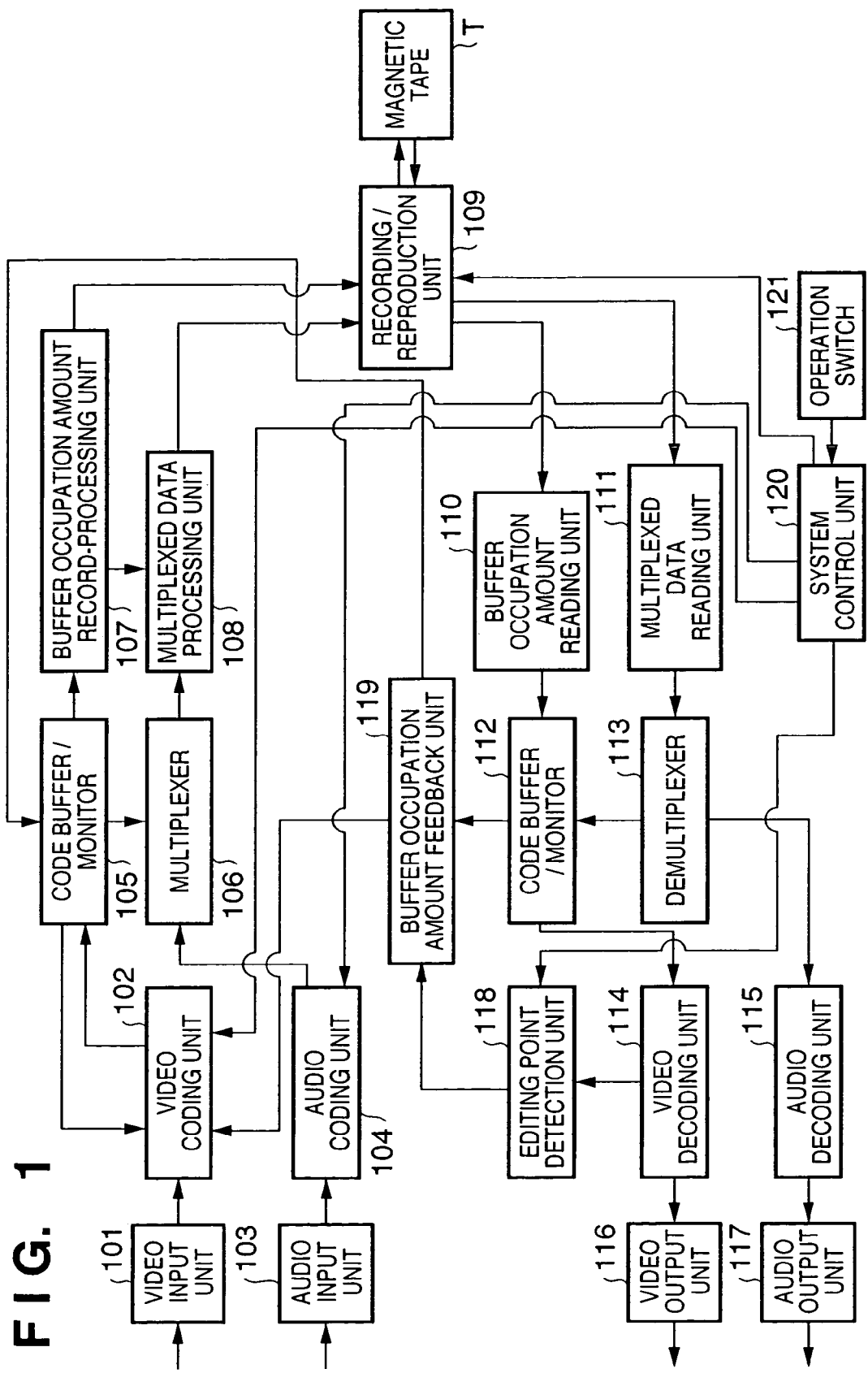
FIG. 1 is a block diagram showing the construction of a first embodiment of the present invention.

FIG. 1 is a block diagram showing the construction of a recording apparatus according to a first embodiment of the present invention.

In FIG. 1, reference numeral 101 denotes a video input unit generally comprised of a video camera, a sensor and an A/D converter. Numeral 102 denotes a video coding unit such as a video encoder compliant with the MPEG standard which appropriately performs coding amount control. On the other hand, numeral 103 denotes an audio input unit comprised of a microphone and an A/D converter. Numeral 104 denotes an audio coding unit using coding methods corresponding to various standards, the details of which will not be described in the present embodiment. Numeral 105 denotes a code buffer/monitor connected to a VBV buffer in use of MPEG coding as described in the conventional art. Numeral 106 denotes a multiplexer in which video and audio code data are inputted and multiplexed. At this time, synchronization between the video and audio data is controlled. The video coding unit 102 encodes the video data based on the amount of data occupying the code buffer/monitor 105 (VBV buffer) such that the code amount of the video data (data rate) does not exceed a predetermined value.

Numeral 108 denotes a multiplexed data recording unit which converts the code data multiplexed by the multiplexer to data appropriate for recording on a magnetic tape T as a recording medium. On the other hand, numeral 107 denotes a buffer occupation amount record-processing unit which outputs information indicating the buffer occupation amount, monitored by the code buffer/monitor 105, with the multiplexed data, to the recording/reproduction unit 109 so as to record the data with the multiplexed data. In the present embodiment, as particular buffer occupation amount information, the number of bits of video data stored in the code buffer/monitor 105 is recorded. The recording/reproduction unit 109 forms a large number of helical tracks on the magnetic tape T by a rotary head, and records the multiplexed data and the buffer occupation amount information as described later.

The functions of the recording side are as described above. Hereinbelow, the functions on the reproduction side will be described. Numeral 111 denotes a multiplexed data reading unit which reads the multiplexed data recorded on the magnetic tape T; 110, a buffer occupation amount reading unit which reads the buffer occupation amount information recorded by the buffer occupation amount record-processing unit 107; 213, a demultiplexer which demultiplexes the multiplexed data into video code data and audio code data; and 114, a video decoding unit which decodes the video code data. Numeral 112 denotes a code buffer/monitor which performs code buffer control in accordance with the video decoding process by the video decoding unit 114.

Numeral 115 denotes an audio decoding unit which decodes the audio code data; 116, a video output unit such as a general display device to display an image; 117, an audio output unit such as a general speaker to reproduce an audio signal.

The video coding unit 102, an editing point detection unit 118 and a buffer occupation amount feedback unit 119 are arranged so as to operate in coordination with each other, which is a main characteristic feature of the present invention. The editing point detection unit 118 detects a point where additional recording/overwriting can be performed by GOP, as described in the above conventional art. The buffer occupation amount feedback unit 119 transmits the buffer occupation amount information recorded immediately before the editing point to the video coding unit 102, such that the information is further transmitted to the code buffer/monitor 105.

On the other hand, upon additional recording/overwriting on the coding side, the buffer occupation amount information monitored in the previous coding process is reset, then the buffer occupation amount information transmitted from the buffer occupation amount feedback unit 119 is set, and coding and recording are started.

Numeral 120 denotes a system control unit which controls the operations of the respective units in accordance with an instruction from an operation switch 121.

Figure 6:
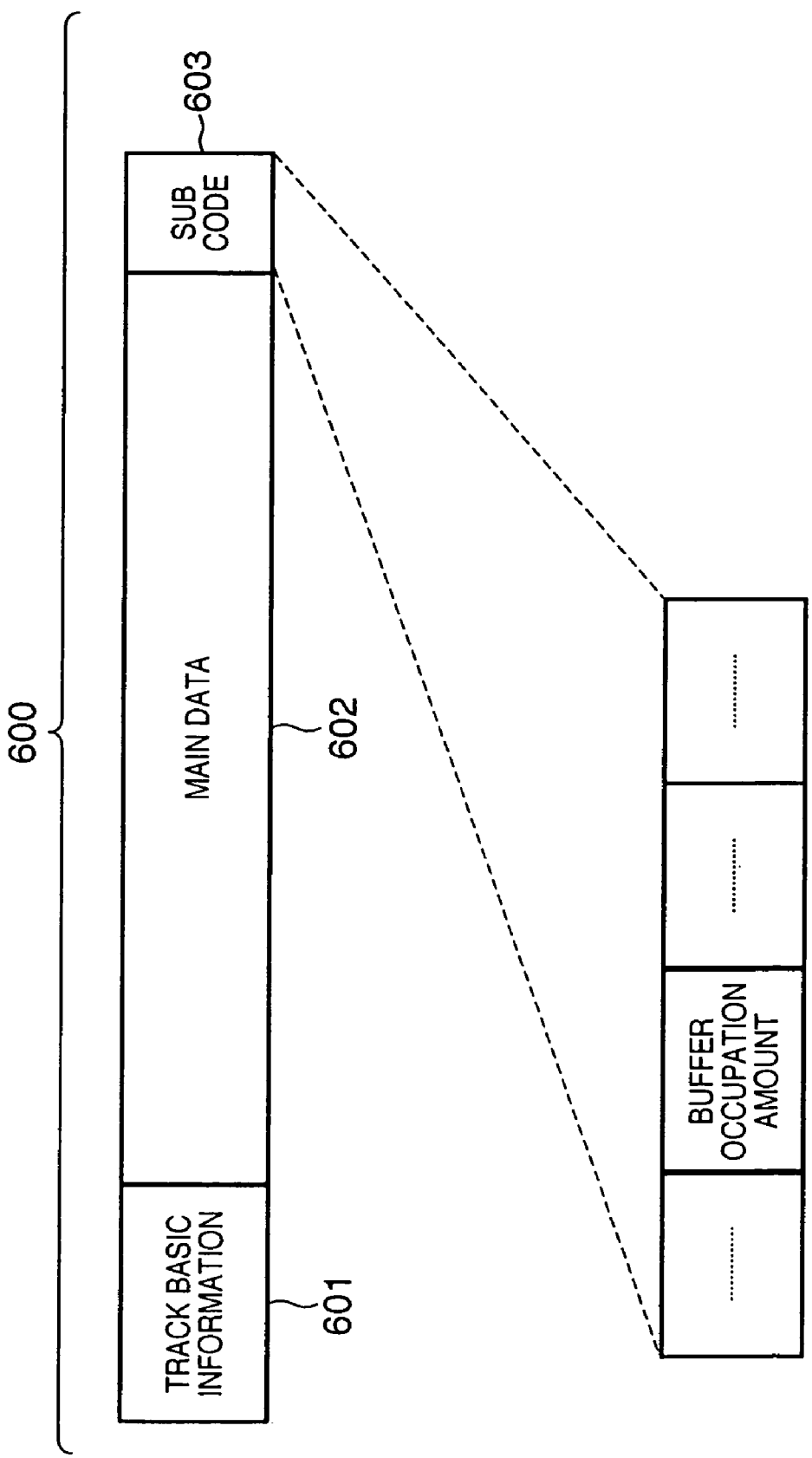
FIG. 6 is an explanatory view of location of the buffer occupation amount information in a track.
Figure 7:
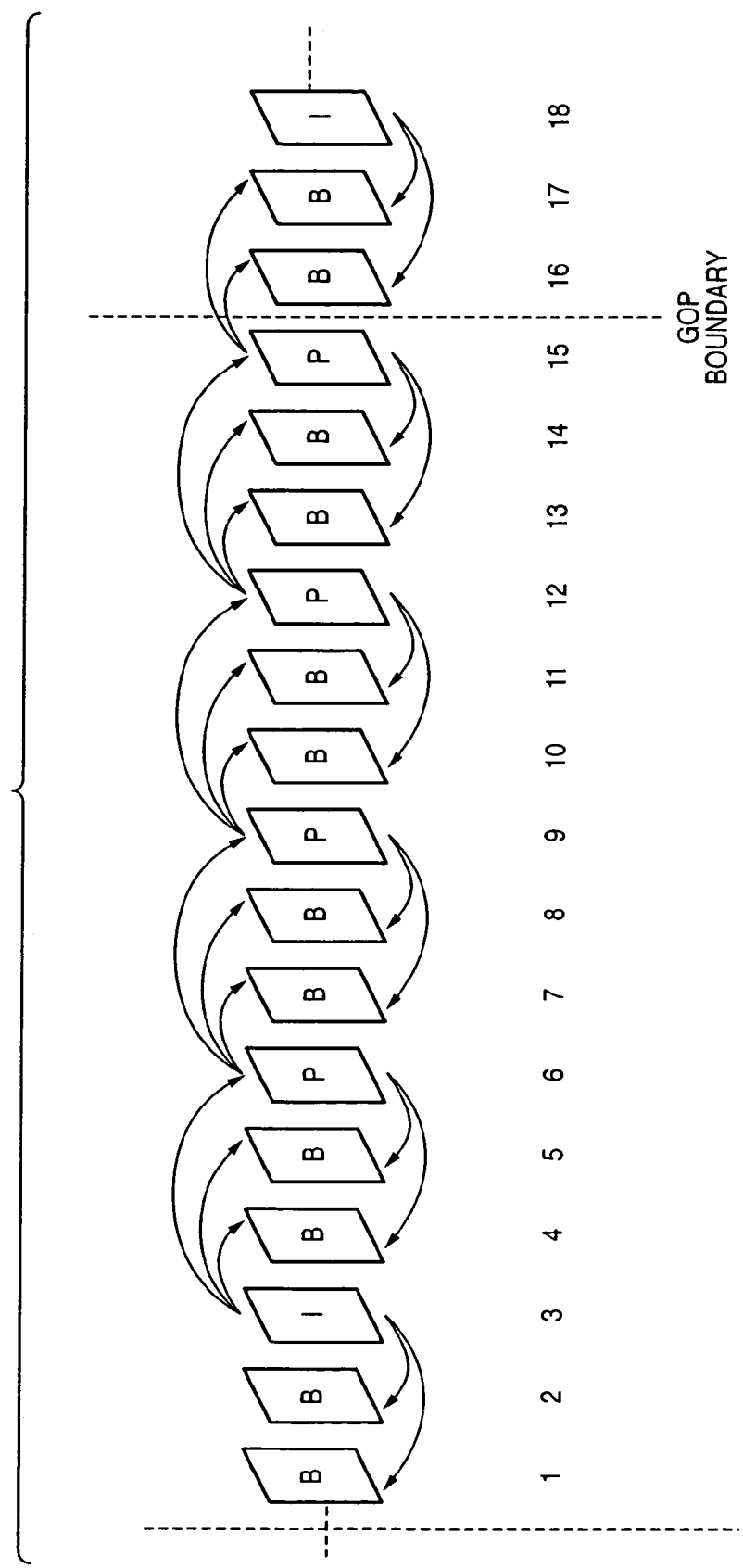
FIG. 7 is an example of a GOP in an MPEG stream.
Figure 8:
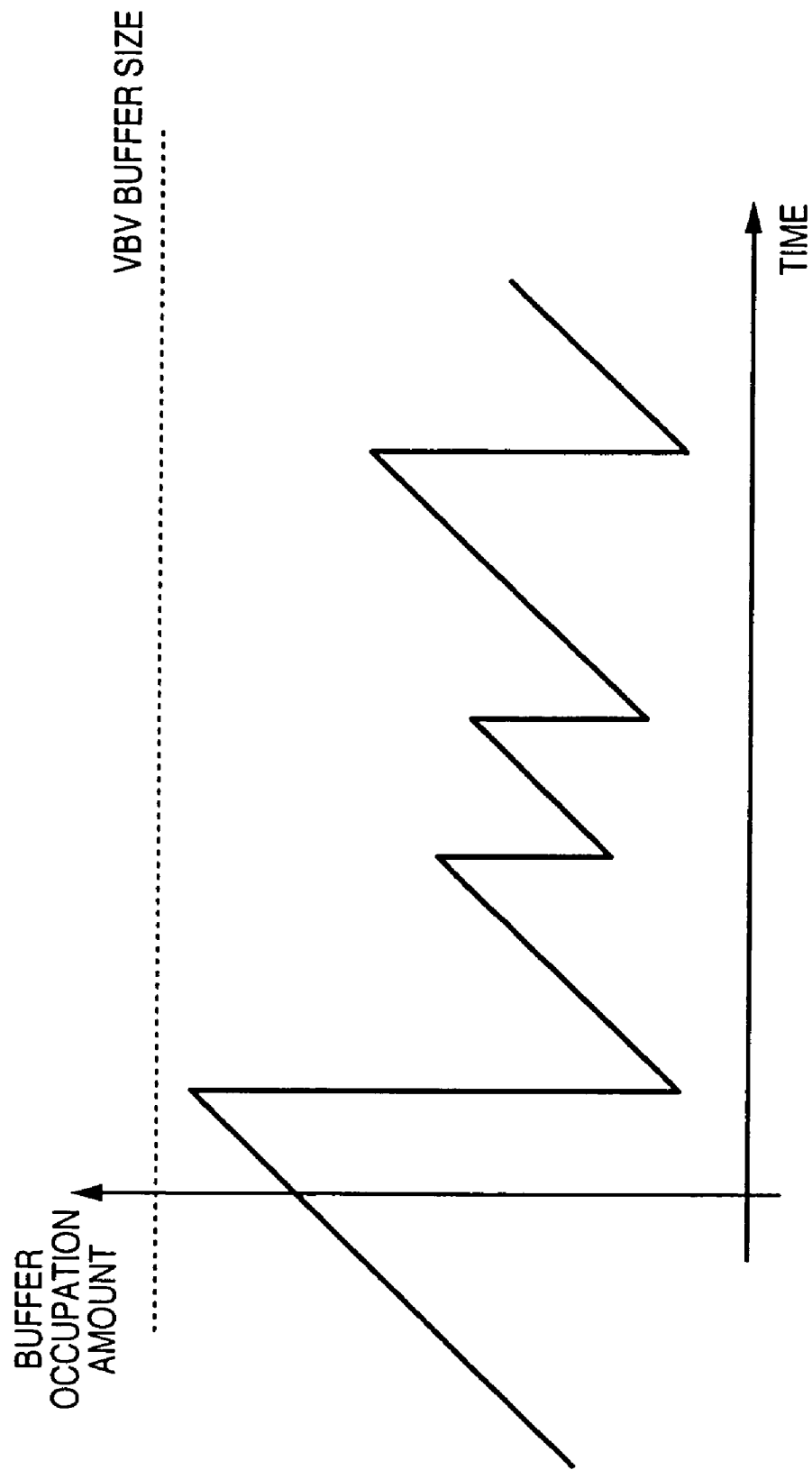
FIG. 8 is a graph showing time change of the buffer occupation amount.
Figure 9:
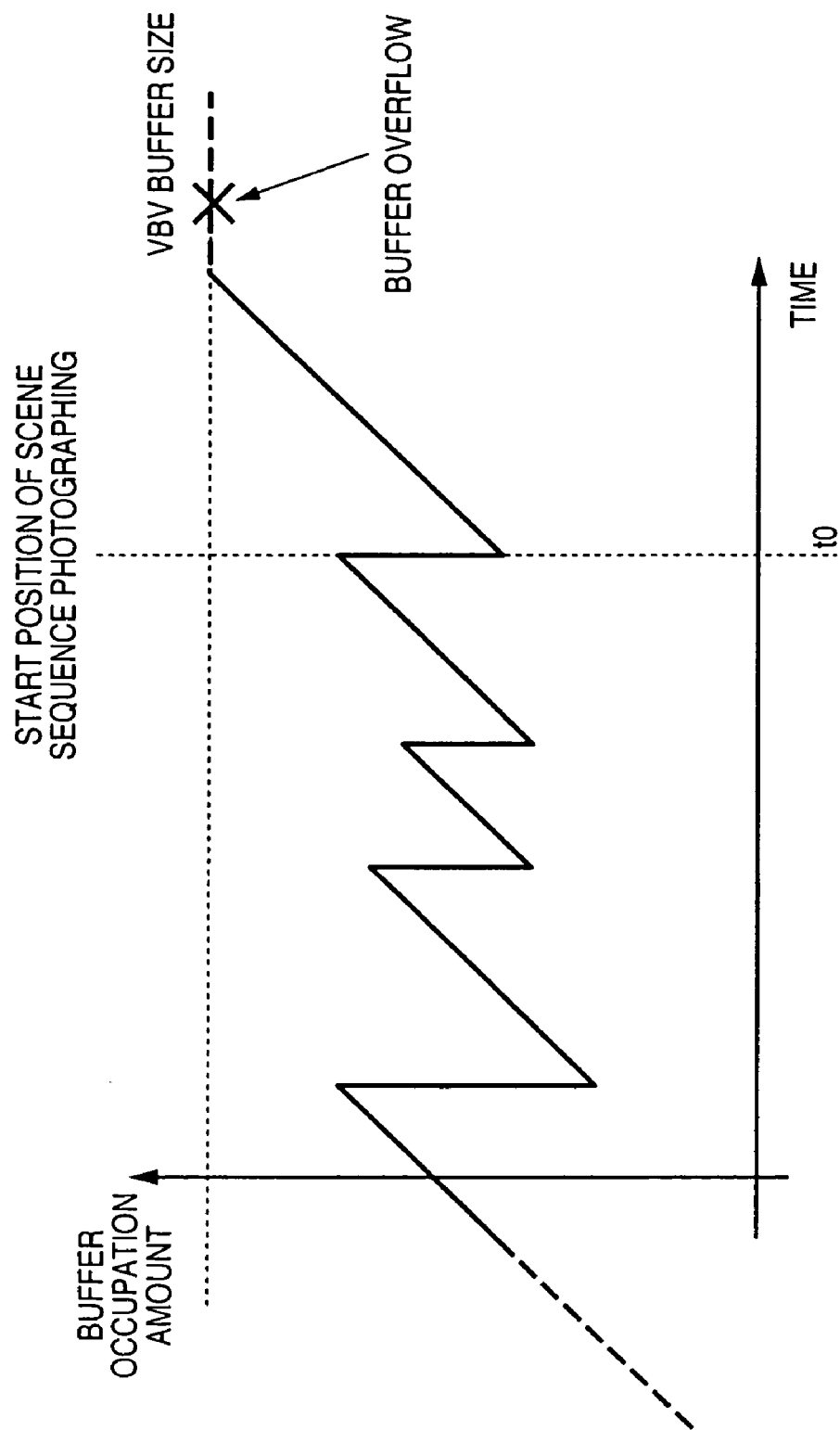
FIG. 9 is an example of overflow in the rate control.
Figure 10:
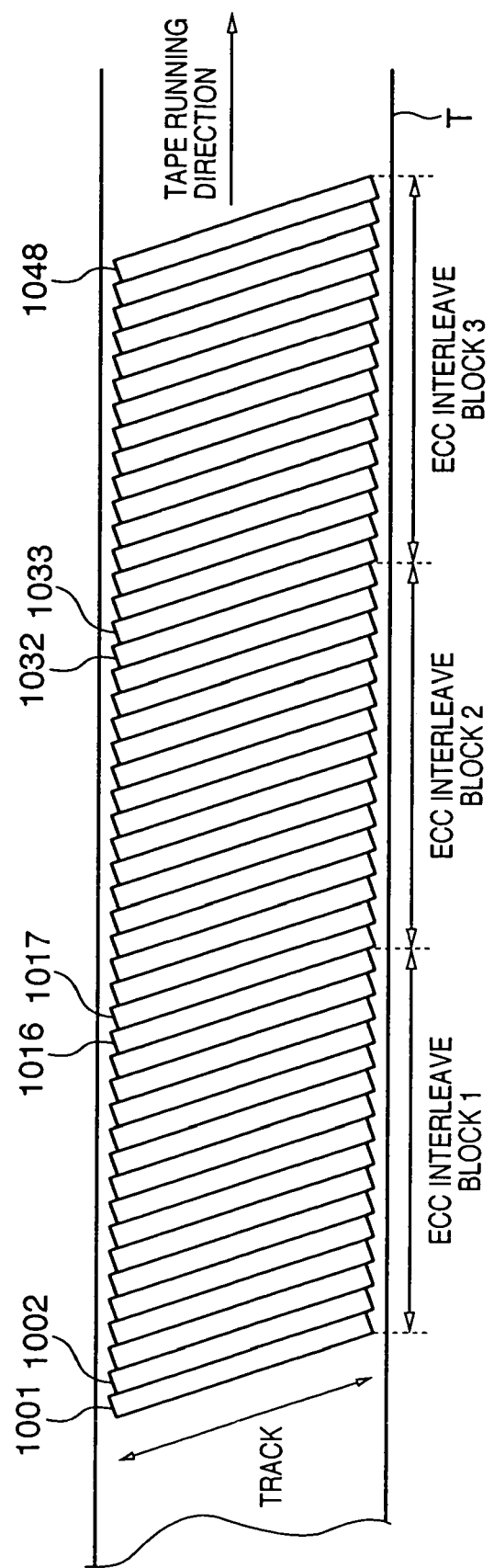
FIG. 10 is an example of track information arrangement in a general tape medium.

FIG. 6 shows an example of a recording position of the buffer occupation amount data according to the present embodiment. In FIG. 6, 1-track data 600 includes track basic information 601, main data 602 and sub code 603. The buffer occupation amount information is written in a part of the sub code 603. For example, in an MPEG-2 MP@ML mode, as the value of buffer occupation amount is 0 (in this case, underflow substantially occurs) to 1,835,008 bits, a sufficient size of buffer occupation amount information is 21 bits.

Figure 5:
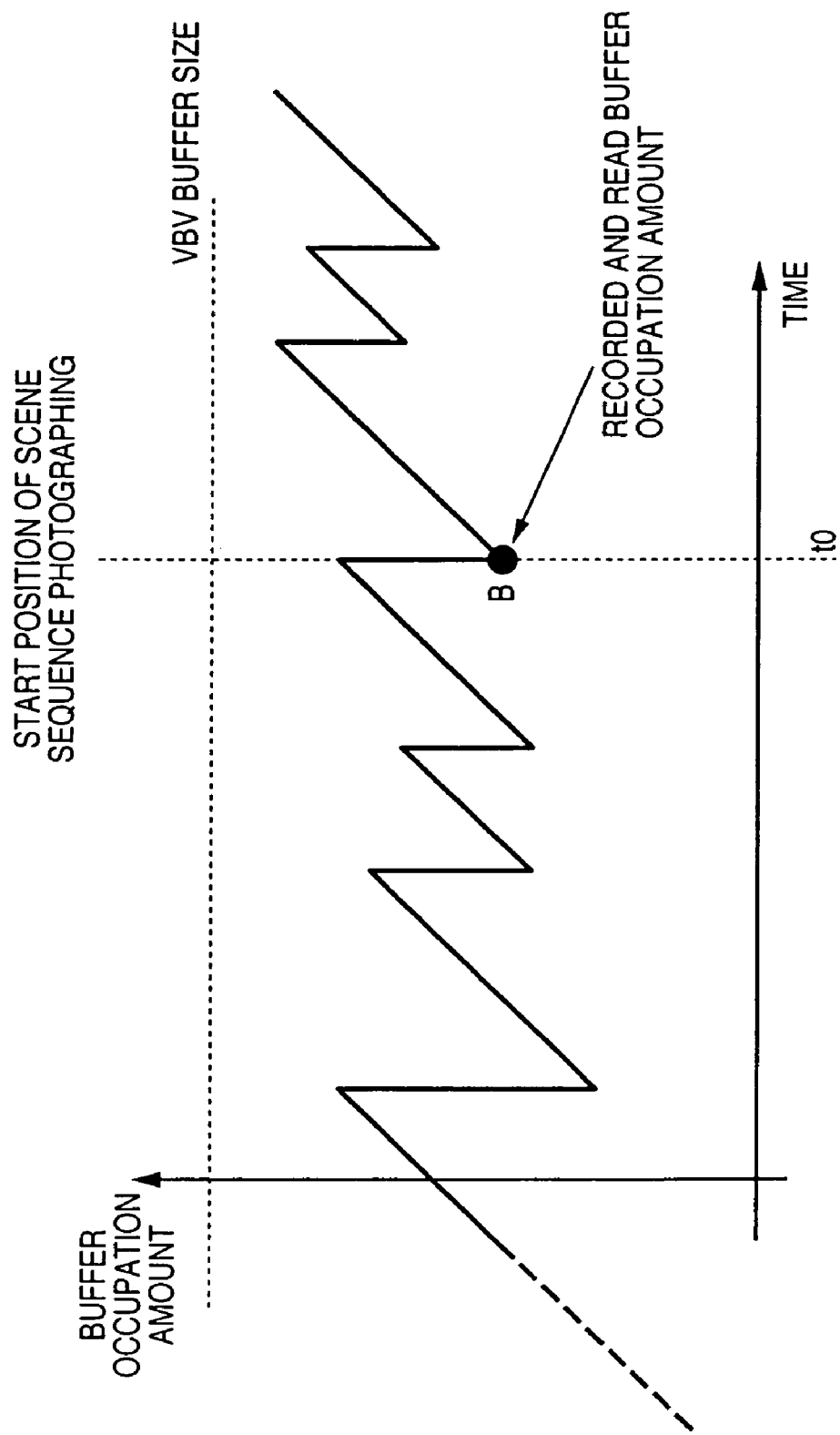
FIG. 5 is a graph showing an example of rate control according to the first embodiment.

FIG. 5 is an explanatory view of an example of buffer control according to the present embodiment. In a point B, immediately before a point designated by the editing point detection unit 118 as an editing point where scene-sequence photographing can be performed, the buffer occupation amount information is transmitted from the buffer occupation amount feedback unit 119 to the video coding unit 102.

Next, processing upon such scene-sequence photographing will be described.

A user operates the operation switch 121 to reproduce the data including the multiplexed data (image and audio data) and the buffer occupation amount information recorded on the tape T as described above, and while checking the image outputted from the video output unit, gives an instruction of temporary stop in a position to start new image data recording.

Upon reception of the instruction of temporary stop, the system control unit 120 notifies the editing point detection unit 118 of the instruction. The editing point detection unit 118 detects a track including the last frame of GOP including a frame reproduced upon reception of the instruction of temporary stop, and notifies the track position to the buffer occupation amount feedback unit 119. The buffer occupation amount feedback unit 119 detects the buffer occupation amount information reproduced from a track immediately before the temporary stopped track detected by the editing point detection unit 118, from the buffer occupation amount information outputted from the code buffer/monitor 112, and notifies the information to the video coding unit 102.

In this status, the user operates the operation switch 121 to instruct to start recording of new image and audio data, the system control unit 120 instructs the video coding unit 102 and the audio coding unit 104 to start coding, and at the same time, instructs the recording/reproduction unit 109 to start recording.

Upon reception of instruction to start coding of new video signal, the video coding unit 102 encodes video data such that the data rate of the newly recorded video data does not exceed the predetermined data rate, based on the buffer occupation amount information recorded in the position immediately before the scene-sequence photographing, outputted from the buffer occupation amount feedback unit 119 as described above, and outputs the code data to the code buffer/monitor 105. The processing hereinafter is the same as that in normal recording.

In this manner, when scene-sequence photographing is started, first, the buffer occupation amount in a position (point B) immediately before the start position of scene-sequence photographing is set, and the video coding unit 102 starts coding based on the buffer occupation amount information. This prevents an overflow status of the buffer memory on the decoding side upon data reproduction after scene-sequence photographing.

As described above, according to the present embodiment, upon additional recording/overwriting on a magnetic tape, seamless reproduction can be performed without frame skip due to overflow of decoding side buffer memory in a start position of scene-sequence photographing.

Note that in a case where normal recording is temporarily stopped and then the recording is restarted, the buffer occupation amount information stored in the code buffer/monitor 105 upon stoppage is saved, and upon start of the next recording (coding), the data rate of the video data is controlled based on the saved buffer occupation amount information.

Further, in the present embodiment, in a case where a tape T where data is already recorded as described above is newly attached to a VTR 100, the system control unit 120 automatically reproduces the data from a position immediately before the current tape position as described above, and notifies the buffer occupation amount information, detected from a position immediately before an editing point detected by the editing point detection unit 118, from the feedback unit 119 to the video coding unit 102.

Second Embodiment

Hereinbelow, a second embodiment of the present invention will be described. As the second embodiment is a recording apparatus similar to that of the first embodiment, explanations of elements corresponding to those of the first embodiment will be omitted, and characteristic features of the present embodiment will be mainly described.

Figure 2:
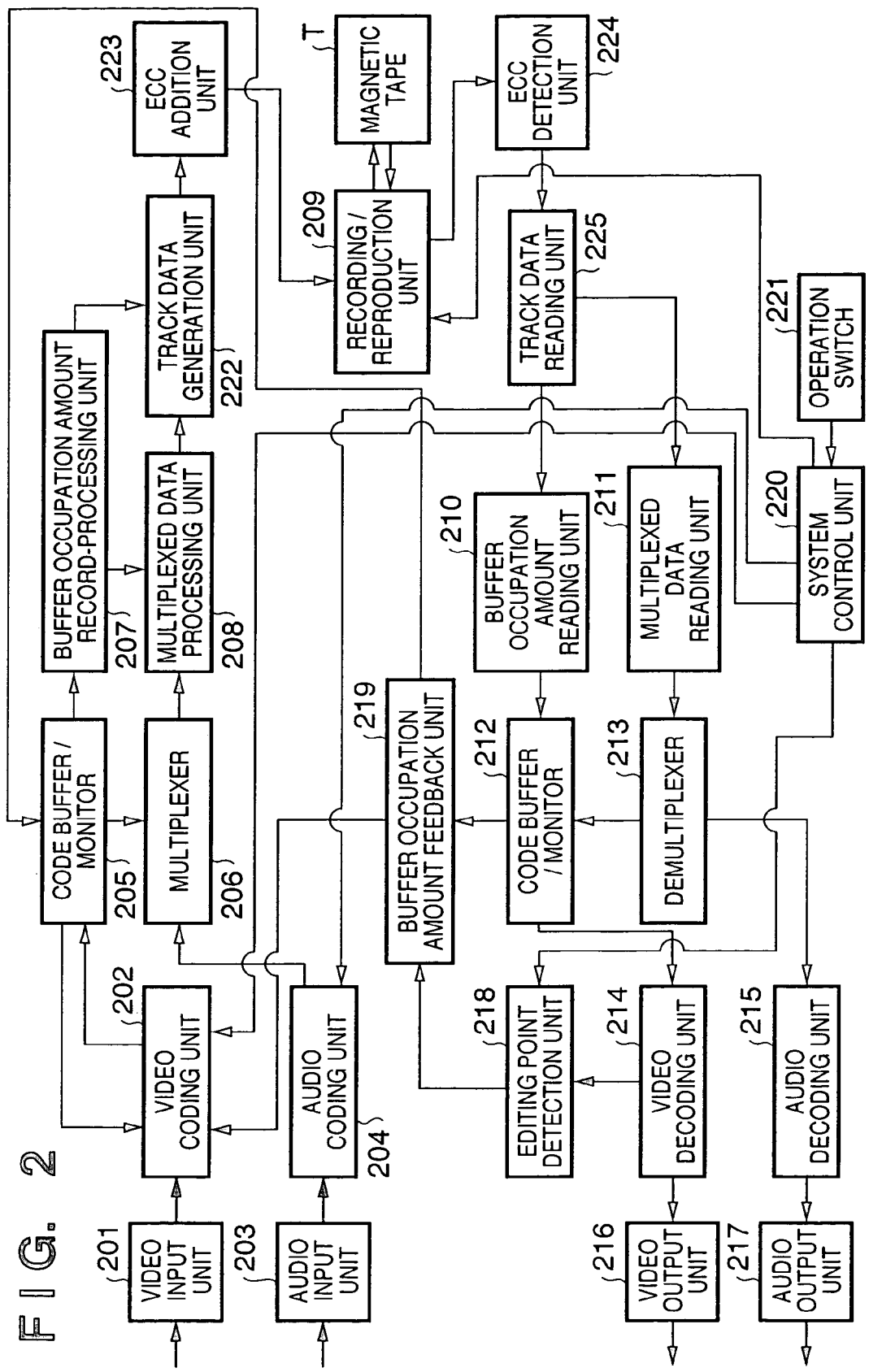
FIG. 2 is a block diagram showing the construction of a second embodiment of the present invention.

FIG. 2 is a block diagram showing the construction of the recording apparatus according to the second embodiment of the present invention. In the second embodiment, numerals 201 to 221 denote elements corresponding to those with numerals 101 to 121 in FIG. 1 described in the first embodiment.

Numeral 222 denotes a track data generation unit which generates code data in editing-possible units on at least one track. At this time, the above-described buffer occupation amount information is appropriately recorded in a predetermined position on the track. As in the case of FIG. 6 described in the first embodiment, the buffer occupation amount information is written in a sub code area of an appropriate track. However, it is preferable that the buffer occupation amount information is written in a sub code area of a final track immediately before a position where additional recording/overwriting can be performed.

Numeral 223 denotes an ECC addition unit which adds an ECC code by ECC interleave block comprised of at least one track, as a countermeasure for reading error; 224, an ECC detection unit which checks added ECC data and appropriately performs error correction; and 225, a track data reading unit which extracts multiplexed code data and the buffer occupation amount information from track data and transmits the read data to the subsequent unit.

In the present embodiment, the buffer occupation amount information is rewritten by n (integer equal to or greater than 1) tracks constituting an ECC interleave block recorded on the magnetic tape T. Accordingly, the reading of the buffer occupation amount information is performed by n tracks. Other processings are the same as those described in the first embodiment.

According to the present embodiment, upon additional recording/overwriting on a magnetic tape by ECC interleave block, seamless scene-sequence photographing without frame skip can be performed.

Third Embodiment

Hereinbelow, a third embodiment of the present invention will be described. As the third embodiment is a recording apparatus similar to that of the above embodiments, explanations of elements corresponding to those of the first and second embodiments will be omitted, and characteristic features of the present embodiment will be mainly described.

Figure 3:
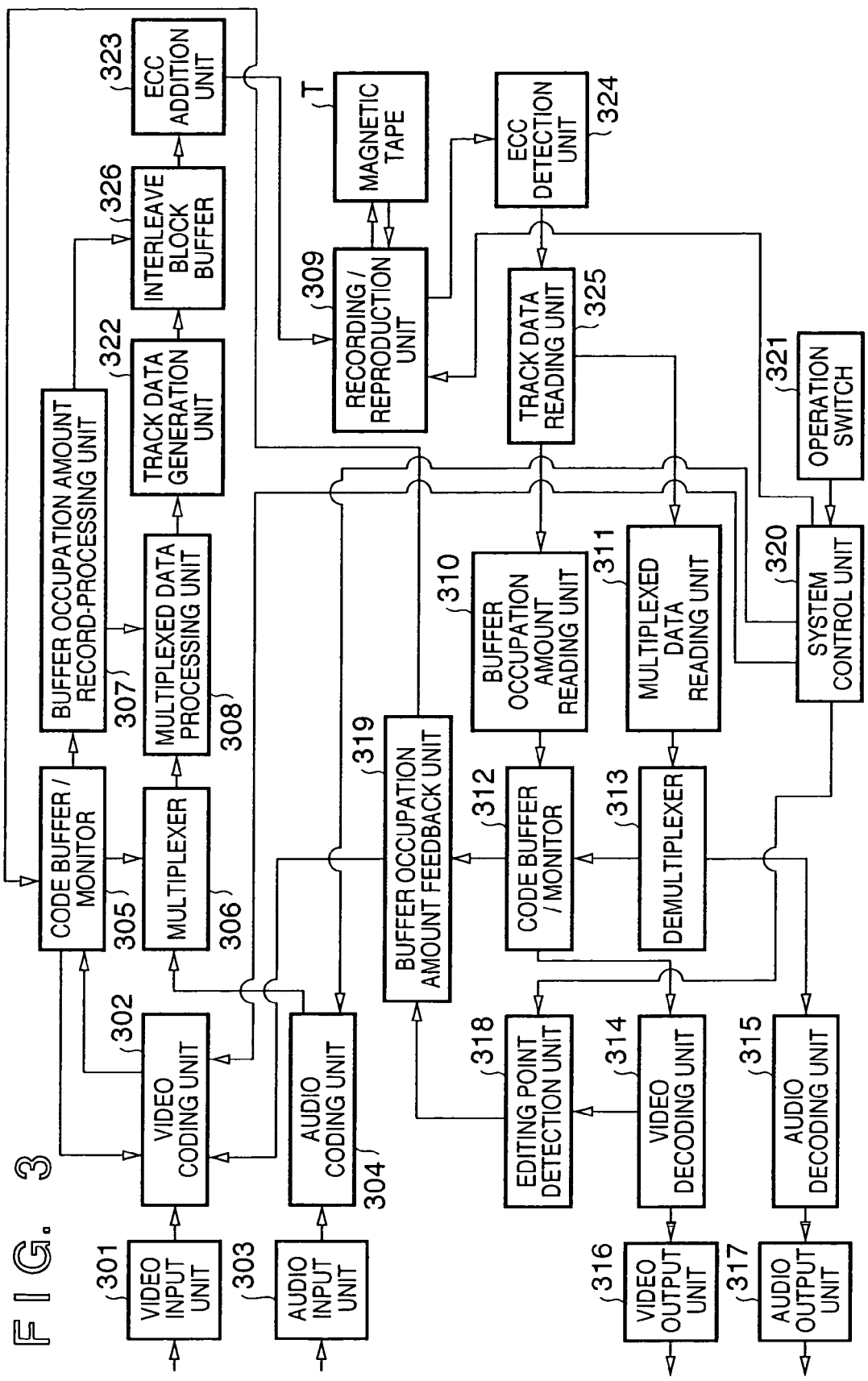
FIG. 3 is a block diagram showing the construction of a third embodiment of the present invention.

FIG. 3 is a block diagram showing the construction of the recording apparatus according to the third embodiment of the present invention. In the third embodiment, numerals 301 to 321 denote elements corresponding to those with numerals 101 to 121 in FIG. 1 described in the first embodiment, and numerals 322 to 325 denote elements corresponding to those with numerals 222 to 225 in FIG. 2 described in the second embodiment.

In the present embodiment, upon addition recording or overwriting, the continuity between the position of completion of the additional recording or overwriting and video data recorded as the background is considered.

In the present embodiment, on the assumption that the number of tracks constituting an interleave block is greater than 1, an interleave block buffer 326 is provided. The buffer occupation amount information during processing of interleave block data is temporarily stored in the interleave block buffer 326. In this arrangement, the buffer occupation amount information in the next recording end point can be recorded in a previous editing point where additional recording/overwriting can be possible.

In this arrangement, when an instruction to stop additional recording/overwriting is given regarding an interleave block where the additional recording/overwriting is performed, since expected buffer occupation amount information can be obtained upon completion of coding of the interleave block, the code amount can be controlled before the additional recording/overwriting is actually completed. Thus coding can be performed with the buffer occupation amount information upon completion of additional recording/overwriting as a target, and the consistency can be attained between the code amount control upon completion of additional recording/overwriting and the code amount control in background recording.

Figure 4:
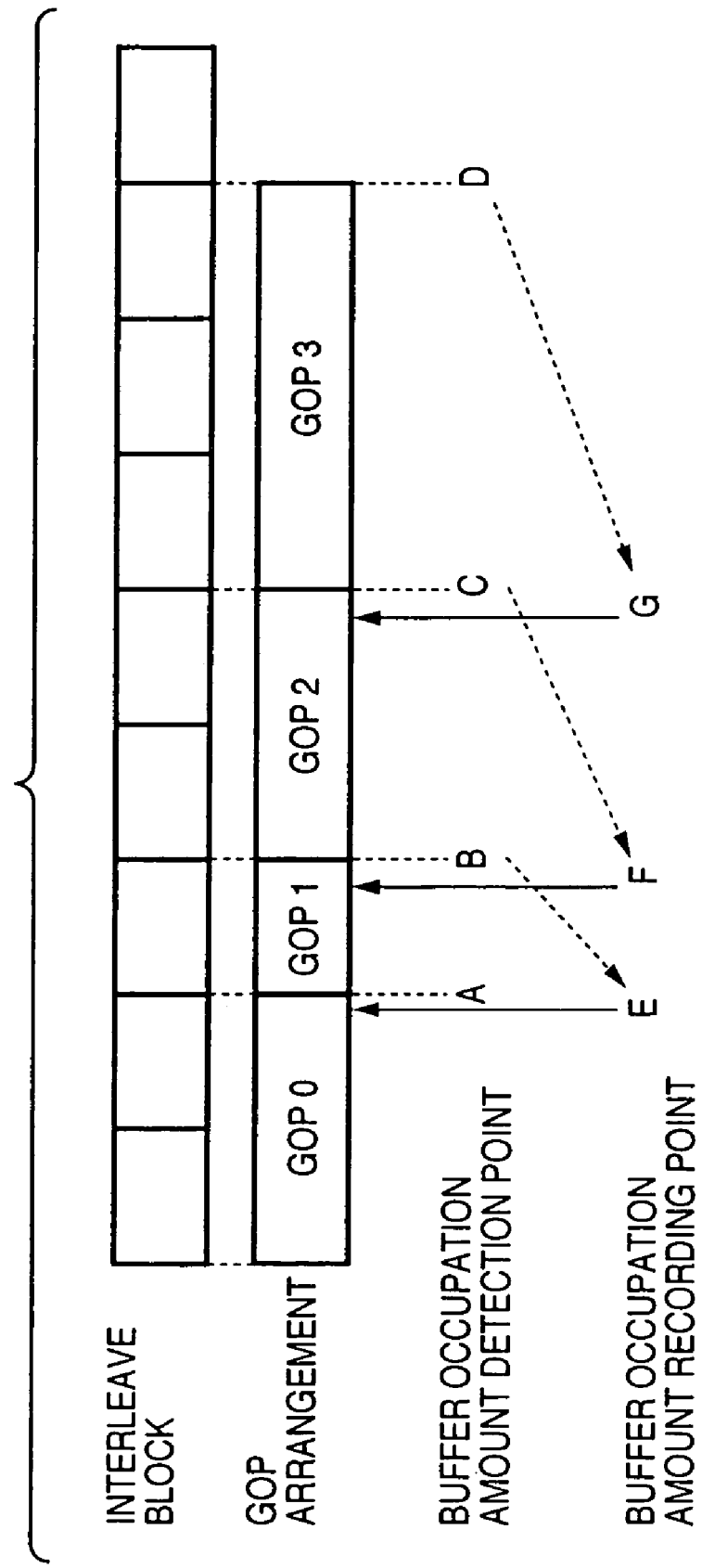
FIG. 4 is an explanatory view of location of buffer occupation amount information according to the third embodiment.

FIG. 4 is an explanatory view of arrangement of the buffer occupation amount information written in each GOP data in a case where additional recording/overwriting is performed in GOP units. It is understood from the figure that the buffer occupation amount information upon completion of GOP coding is positioned before each GOP data.

According to the present embodiment, upon additional recording/overwriting on a magnetic tape by ECC interleave block, the consistency of code amount control can be easily attained, and seamless scene-sequence photographing without frame skip can be performed.

Other Embodiments

In the above embodiments, the recording apparatus performs recording on a tape type recording medium as a random inaccessible medium (only sequential access is possible), however, the present invention is also applicable to a recording apparatus which performs recording on a random-accessible recording medium such as a disk type recording medium.

Note that the present invention can be applied to an apparatus comprising a single device or to system constituted by a plurality of devices.

Furthermore, there are cases where the object of the invention is attained also by supplying a software program (a program comprising program modules embodying blocks shown in FIGS. 1 to 3 of the foregoing embodiments, which can be realized by software), which implements the functions of the foregoing embodiments, directly or remotely to a system or apparatus, reading the supplied program codes with a computer of the system or apparatus, and then executing the program code. In this case, so long as the system or apparatus has the functions of the program, the mode of implementation need not rely upon a program.

Accordingly, since the functions of the present invention are implemented by computer, the program code per se installed in the computer also implements the present invention. In other words, the claims of the present invention also cover a computer program that is for the purpose of implementing the functions of the present invention.

In this case, so long as the system or apparatus has the functions of the program, the form of the program, e.g., object code, a program executed by an interpreter or scrip data supplied to an operating system, etc., does not matter.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser possessed by the client computer, and the computer program per se of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image data recording apparatus comprising:

coding means for encoding image data using a buffer memory;

buffer occupation amount detection means for, upon coding by said coding means, detecting a code amount of the image data occupying the buffer memory, and outputting buffer information related to the detected code amount of the image data;

storing means for storing the buffer information output by said buffer occupation amount detection means;

code amount control means for controlling a coding rate of said coding means so that the code amount of the image data occupying the buffer memory does not exceed a predetermined range;

recording means for recording the coded image data and the buffer information on a recording medium; and reproducing means for reproducing the encoded image data and the buffer information from the recording medium, wherein said code amount control means controls, in a first scene-sequence recording mode in which the recording by said recording means is temporarily stopped and then the recording to the same recording medium is restarted, the coding rate of the image data at restart of the recording based on the buffer information stored by said storing means at the time when the recording was temporarily stopped, and controls, in a second scene-sequence recording mode in which said recording medium is newly attached to the image data recording apparatus and the recording is started from a recording start position of said recording medium, the coding rate at start of the recording based on the buffer information recorded in the position immediately before the start position of the recording medium and obtained by said reproducing means.

* * * * *